(12) United States Patent
Haussecker et al.

(10) Patent No.: US 8,106,609 B2
(45) Date of Patent: Jan. 31, 2012

(54) DRIVE AND EVALUATION UNIT

(75) Inventors: Walter Haussecker, Buehlertal (DE);
Dirk Buehler, Buehl (DE); Peter Froehlich, Changsha Hunan (CN);
Francois Schramm, Strasbourg (FR);
Volker Hertweck, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 531 days.

(21) Appl. No.: 12/295,783

(22) PCT Filed: Mar. 20, 2007

(86) PCT No.: PCT/EP2007/052616
§ 371 (c)(1), (2), (4) Date: Jan. 26, 2009

(87) PCT Pub. No.: WO2007/115907
PCT Pub. Date: Oct. 18, 2007

(65) Prior Publication Data
US 2009/0304369 A1     Dec. 10, 2009

(30) Foreign Application Priority Data
Apr. 3, 2006 (DE) .......................... 10 2006 015 392

(51) Int. Cl.
*H02K 1/17* (2006.01)
*H02K 3/12* (2006.01)

(52) U.S. Cl. .......................... 318/266; 310/68 B; 310/71

(58) Field of Classification Search ................ 310/68 B, 310/71; 318/266, 400.41, 466
See application file for complete search history.

(56) References Cited

U.S. PATENT DOCUMENTS

| | | | |
|---|---|---|---|
| 5,175,460 A | * | 12/1992 | Ishizuka ................. 310/154.09 |
| RE35,855 E | * | 7/1998 | Blaettner et al. .............. 384/204 |
| 6,346,756 B1 | | 2/2002 | Ishikawa et al. |
| 2007/0013331 A1 | | 1/2007 | Kalb |

FOREIGN PATENT DOCUMENTS

| | | |
|---|---|---|
| DE | 102004012431 A1 | 9/2005 |
| EP | 1744164 A2 | 1/2007 |

* cited by examiner

*Primary Examiner* — Derek Rosenau
(74) *Attorney, Agent, or Firm* — Ronald E. Greigg

(57) ABSTRACT

The invention relates to a drive and evaluation unit for displacing an object to be displaced, particularly for raising and lowering a side window in a motor vehicle. The drive includes a commutator motor with a stator having two diametrically opposed permanent magnets. The magnets have cross-sectional shapes of a respective peripheral contour segment, having a radial inner peripheral contour segment which encompasses an armature over a respective inner peripheral angle. The armature is provided with ten grooves spaced around its periphery for holding armature windings that are configured as lap windings. The evaluation unit includes a device for determining the rotational position of the armature by evaluating the ripple count of the armature current. According to the invention, the armature windings are configured as short pitch windings, and the inner peripheral angle of the radial inner peripheral contour segment of at least one of the magnets is between 101° and 111°.

19 Claims, 2 Drawing Sheets

DRIVE AND EVALUATION UNIT

CROSS-REFERENCE TO RELATED APPLICATION

This application is a 35 USC 371 application of PCT/EP 2007/052616 filed on Mar. 20, 2007.

BACKGROUND OF THE INVENTION

1. Field of the Invention

The invention relates to a drive and evaluation unit, in particular for raising and lowering a side window in a motor vehicle.

2. Description of the Prior Art

For positional determination of displacement systems driven by commutator motors, it is known to evaluate the waviness of the armature current. This method is called the ripple count method. In it, a frequency that is proportional to the motor rpm and is modulated to the armature current is analyzed by means of an evaluation unit. The possible system-characteristic frequency that can be used for this purpose is caused by the commutation between the individual armature windings and thus makes it possible to subdivide one revolution of the electric motor into a number of partial revolutions corresponding to the number of commutations, so that for instance if there are six segments of the commutator, six maximum current waviness points per revolution of the armature occur. These maximum points are counted by the evaluation unit. Since a fixed relationship exists between the revolution of the armature of the commutator motor and the position of the displacement object, the position of the displacement object can be determined by way of evaluating the position of the commutator motor. In known drive and evaluation units, it is problematic that the amplitudes of the vibration modulated to the armature current usually have such a low intensity that miscounts and hence incorrect position determinations result.

OBJECT AND SUMMARY OF THE INVENTION

The object of the invention is an improved drive and evaluation unit, with which the likelihood of miscounts of the amplitudes of a system-characteristic vibration modulated to the armature current is reduced.

The invention is based on the concept of combining an especially embodied commutator motor with an evaluation unit, known per se, for counting amplitudes of a system-characteristic vibration of the commutator motor. The commutator motor has ten slots, spaced apart in the circumferential direction, for receiving the armature windings or coil windings. According to the invention, it is provided that the armature winding is embodied not as a diameter winding but rather as a chord winding, with a coil width of y1=3. This means that the conductor of a coil winding in slot n is also passed through the slot n+3. As a result, although the efficiency and noise production may become worse, nevertheless, in combination with the special permanent magnet geometry according to the invention, an increase in the amplitudes of a vibration modulated to the armature current is achieved, the source of which is in the course of the induced voltage and the periodic short-circuit currents, caused by the commutation, in the armature windings. By means of higher amplitudes, the likelihood of miscounts by the evaluation unit known per se is reduced. According to the invention, it is provided that the radially inner circumferential contour segment, oriented toward the armature, of a cross-sectional area of the permanent magnet embraces the armature over an inner circumferential angle $\alpha_i$ within a range of between 101° and 111°. Preferably, the inner circumferential angle $\alpha_i$ is approximately 106°. The inner circumferential contour segment ends at the place where the air gap between the permanent magnet and the armature abruptly increases.

In a refinement of the invention, it is provided that the entire radially inner circumferential contour segment has a pitch-circle-like course about a center point $M_{Ui}$.

The amplitudes of the system-characteristic vibration modulated to the armature current can be increased still further by providing that the cross-sectional area of the permanent magnet has a radially outer circumferential contour segment that is likewise shaped partially circularly. All the further circumferential contour segments of the cross-sectional area, that is, the circumferential contour segments that connect to the inner and outer circumferential contour segments that are each partially circular, represent so-called lateral circumferential contour segments.

According to the invention, it is provided that the lateral circumferential contour segments protrude past the inner and outer circumferential contour segments in the circumferential direction, in at least some regions. The two points of the cross-sectional area of the permanent magnet that are the farthest from one another in the circumferential direction embrace the armature over a maximum circumferential angle $\alpha_{max}$ within an angular range of between 106° and 117°. Preferably, the maximum circumferential angle of the two points of the permanent magnet that are farthest away from each other in the circumferential direction is approximately 111°.

Preferably, the lateral circumferential contour segments can be subdivided into three portions. The first portion extends obliquely outward from the ends, spaced apart in the circumferential direction, of the inner circumferential contour segment, or in other words also extends in the circumferential direction. It has proved advantageous for the first portion to extend at an angle within a range of between 20° and 30°, and preferably of 25°, to an axis that is oriented perpendicular to an axis of symmetry of the cross-sectional area of the permanent magnet. In a refinement of the invention, the first portion is adjoined by the second portion of the lateral circumferential contour segment. This second portion preferably extends parallel to the axis of symmetry of the cross-sectional area and extends in the direction of the outer circumferential contour segment. The ends of the second portions are in turn connected to the ends, spaced apart in the circumferential direction, of the outer circumferential contour segments, each via a respective third portion, which is curved in partially circular fashion about the intersection point of the axis of symmetry and the rotary axis of the armature. The connection points between the third portions and the outer circumferential contour segment form support points for bracing permanent magnets in a motor housing.

Preferably, the two opposed permanent magnets are shaped identically, with opposite polarity. The permanent magnets are braced against one another via at least one spring and are pressed in the direction of the motor housing by the spring force. It is also possible for the magnets to be glued to the motor housing.

BRIEF DESCRIPTION OF THE DRAWINGS

Further advantages and expedient embodiments can be learned from the further claims, the description of the drawings, and the drawings themselves, in which:

In the drawings, identical components and components with the same function are identified by the same reference numerals.

DESCRIPTION OF THE PREFERRED EMBODIMENTS

Figure 1:
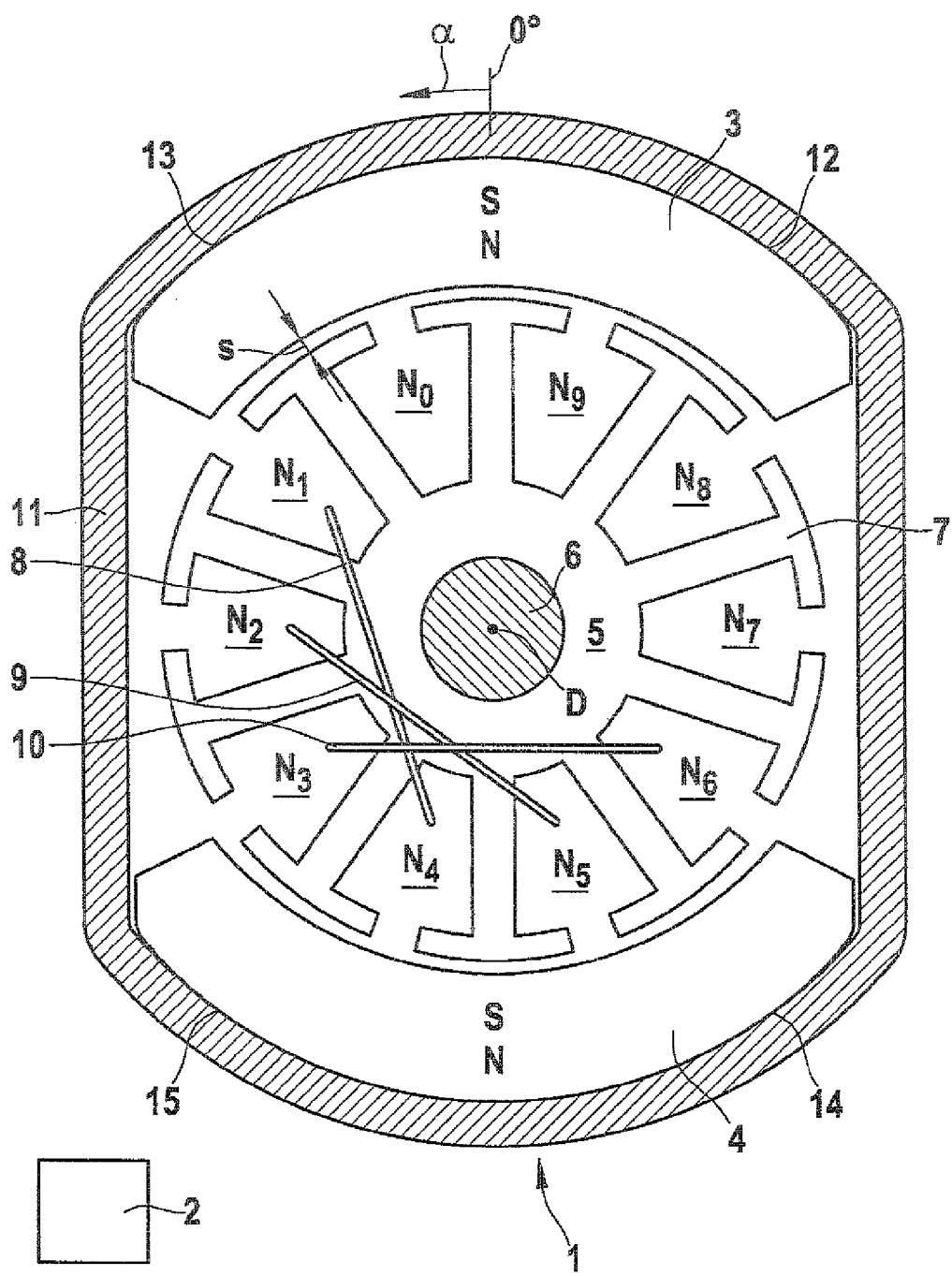
FIG. 1 is a schematic sectional view of the commutator motor.

In FIG. 1, a commutator motor 1 and an evaluation unit 2 are shown. The evaluation unit 2 is connected, via the following elements of electrical connecting lines not shown, to the current supply circuit of the two commutator brushes, not shown. The evaluation unit 2 counts the amplitudes of a vibration that is proportional to the rpm of the commutator motor 1 and is modulated to the armature current. This vibration has its source in the alternating commutation of the armature windings and in the course of the induced voltage inside a partial coil.

The commutator motor 1 has two diametrically opposed permanent magnets 3, 4 of opposite polarity. A substantially cylindrical armature 5 with an armature shaft 6 is disposed rotatably radially inside the permanent magnets 3, 4. The rotary axis of the armature shaft 6 is marked D. The armature 5 has ten V-shaped slots N0 through N9 spaced apart in the circumferential direction. Two adjacent slots are each demarcated from one another by one of a total of ten pole teeth 7. The slots N0 through N9 serve to receive the armature windings, of which as examples only three armature windings 8, 9, 10 are shown. The armature windings are embodied as chord windings with a coil width of y1=3. The armature winding through the slot n thus also extends through the slot n+3. For instance, the armature winding 8 extends through the slots N1 and N4; the armature winding through the slot N2 also extends through the slot N5; and the armature winding 10 through the slot N3 also extends through the slot N6. An armature winding not shown also extends through the slot N1 as well as through the slot N8, so that a total of ten armature or coil windings are provided. One commutator segment, not shown, is assigned to each coil winding, so that by the induced voltage and the commutation operations during one revolution, a vibration with ten, or a multiple of ten, amplitudes is generated, which amplitudes are modulated to the armature current delivered to the evaluation unit 2. The number of amplitudes is proportional to the rpm or revolution of the armature 5, so that by counting the amplitudes (ripple count), a conclusion can be drawn about the armature position and thus the position of a displacement object, in particular a side window in a motor vehicle. The armature windings embodied as lap windings can be connected to the commutator segments in either a crossing or noncrossing manner.

The commutator motor 1 is disposed in a pole housing 11. The permanent magnets 3, 4 each rest on two support lines 12, 13, 14, 15, extending perpendicular to the plane of the drawing, on the inner wall of the housing 11, and as a result, an exact positioning in the housing 11 is possible. The two permanent magnets 3, 4 are braced against one another via springs, not shown, and are thus pressed with the support lines 12 through 15 against the inner wall of the housing 11. The air gap s between the armature and the permanent magnets 3, 4 varies in the circumferential direction. Beginning at the middle, the air gap s widens toward the ends, spaced apart in the circumferential direction, of the permanent magnets 3, 4.

The circumferential angle relative to the rotary axis D is marked α.

Figure 2:
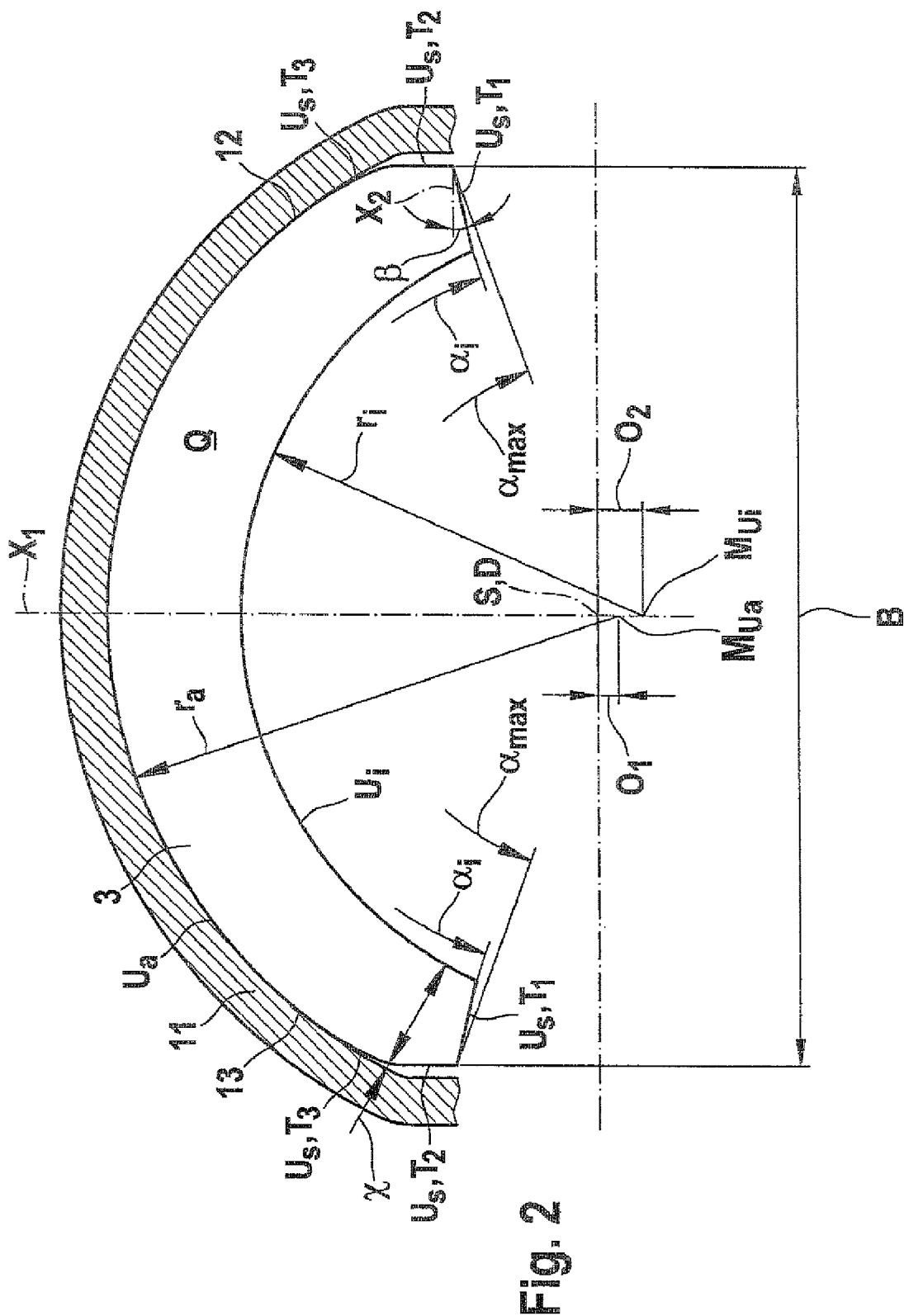
FIG. 2 is a sectional view of a permanent magnet of the commutator motor of FIG. 1.

The amplitudes of the rpm-proportional vibration are increased by the combination comprising the armature windings having a coil width of y1=3, the total of ten slots, and the special geometry of the permanent magnets. The geometry according to the invention of at least one of the permanent magnets 3, 4, and preferably both permanent magnets 3, 4, will be described below in further detail in conjunction with FIG. 2.

An essential characteristic is the circumferential length of the radially inner circumferential contour segment $U_i$ of the cross-sectional area Q of the permanent magnets 3, 4.

The radially inner circumferential contour segment Ui extends over a circumferential angle αi of 106° relative to the rotary axis D of the armature. The radially inner circumferential contour segment Ui is embodied as partially circular, with a radius ri=15.8±0.5 mm about a center point MUi. A likewise partially circular outer circumferential contour segment Ua is provided, radially spaced apart from the inner circumferential contour segment Ui. The radius $r_a$ of the radially outer circumferential contour segment Ua about a center point MUa is 20.2±0.5 mm. Both center points MUi and MUa are located on an axis of symmetry X1 of the cross-sectional area Q of the permanent magnet 3. This axis of symmetry X1 intersects the rotary axis D of the armature at the point S. The center point of the radially outer circumferential contour segment Ua is offset, in the plane of the drawing, downward relative to the intersection point S by an offset value O1 of 0.33±0.5 mm. The center point MUi of the radially inner circumferential contour segment Ui is offset downward in the plane of the drawing by an offset value O2 of 1.28±0.5 mm relative to the intersection point S.

The outer circumferential contour segment $U_a$ and the inner circumferential contour segment $U_i$ are connected to one another via two lateral circumferential contour segments $U_s$. The lateral circumferential contour segments $U_s$ are each subdivided into three portions, namely a first portion $T_1$, a second portion $T_2$, and a third portion $T_3$. The first portions $T_1$, extend outward from the ends, spaced apart in the circumferential direction, of the inner circumferential contour segment at an angle β=25° relative to an axis $X_2$. The first portions $T_1$ are adjoined by the second portions $T_2$. They extend parallel to the axis of symmetry $X_1$, and together with the portions $T_1$, they form a kind of arrowhead pointing in the circumferential direction. The spacing B of the two portions $T_2$, or of the arrowheads, from one another is 30.5 mm and represents the maximum width of the permanent magnet.

The second portions $T_2$ are adjoined by the third portions $T_3$ extending in the direction of the radially outer circumferential contour segment $U_a$. These third portions extend partially circularly about the intersection point S of the axis of symmetry $X_1$ and the rotary axis D of the armature 5. At the point where the third portions $T_3$ meet the outer circumferential contour segment $U_a$, two support points spaced apart in the circumferential direction, or support lines 12, 13, 14, 15 extending perpendicular to the plane of the drawing are formed, with which the permanent magnets 3, 4 rest on the housing 11. The third portions $T_3$ and the inside of the housing 11 form angles χ that increase in the circumferential direction.

The foregoing relates to the preferred exemplary embodiments of the invention, it being understood that other variants and embodiments thereof are possible within the spirit and scope of the invention, the latter being defined by the appended claims.

The invention claimed is:

1. A drive and evaluation unit for displacing an object comprising:
   a commutator motor with a stator having two diametrically opposed permanent magnets, the magnets each embodied by a cross-section having a circumferential contour segment with a radially inner circumferential contour segment;
   an armature having ten slots spaced apart circumferentially, the slots receiving armature windings embodied as lap windings, the armature windings each have a coil width that extends over three slots of the armature, wherein the radially inner circumferential contour segment of the magnets encompass the armature each via a respective inner circumferential angle thereof, and the circumferential angle of the radially inner circumferential contour segment of at least one of the permanent magnets is between 101° and 111°;
   a device for determining a rotary position of the armature by evaluating a waviness of the armature current or ripple count,
   wherein a lateral circumferential contour segment is provided on each of two sides of the permanent magnet, which sides are spaced apart in a circumferential direction and which connect the radially inner and radially outer circumferential contour segments to one another, and the lateral circumferential contour segments protrude in the circumferential direction past the radially inner circumferential contour segment in such a way that the permanent magnet encompasses the armature over a maximum circumferential angle between 106° and 117°.

2. The unit as defined by claim 1, wherein the radially inner circumferential contour segment has a pitch-circle-like course.

3. The unit as defined by claim 1, wherein the circumferential angle of the radially inner circumferential contour segment is 106°.

4. The unit as defined by claim 1, wherein a radially outer circumferential contour segment of the cross-section of the permanent magnet has a pitch-circle-like course.

5. The unit as defined by claim 2, wherein a radially outer circumferential contour segment of the cross-section of the permanent magnet has a pitch-circle-like course.

6. The unit as defined by claim 4, wherein a first axis, on which center points of the radially inner circumferential contour segment and of the radially outer circumferential contour segment are located, intersects a rotary axis of the armature at an intersection point, and the center points and the intersection point are each spaced apart from one another.

7. The unit as defined by claim 5, wherein a first axis, on which center points of the radially inner circumferential contour segment and of the radially outer circumferential contour segment are located, intersects a rotary axis of the armature at an intersection point, and the center points and the intersection point are each spaced apart from one another.

8. The unit as defined by claim 6, wherein the first axis is an axis of symmetry of the cross-section of the permanent magnet.

9. The unit as defined by claim 7, wherein the first axis is an axis of symmetry of the cross-section of the permanent magnet.

10. The unit as defined by claim 1, wherein the maximum circumferential angle is 111°.

11. The unit as defined by claim 1, wherein the lateral circumferential contour segments have a first portion which extends obliquely outward at an angle between 20° and 30°, and which extends in the circumferential direction from the radially inner circumferential contour segment to a second axis extending perpendicular to the first axis.

12. The unit as defined by claim 1, wherein the lateral circumferential contour segments have a first portion which extends obliquely outward at an angle between 20° and 30°, and which extends in the circumferential direction from the radially inner circumferential contour segment to a second axis extending perpendicular to the first axis.

13. The unit as defined by claim 11, wherein each first portion of the lateral circumferential contour segments is adjoined by a second portion thereof, which extends parallel to the first axis.

14. The unit as defined by claim 12, wherein each first portion of the lateral circumferential contour segments is adjoined by a second portion thereof, which extends parallel to the first axis.

15. The unit as defined by claim 14, wherein a radially outer end of each second portion of the lateral circumferential contour segments is connected to the radially outer circumferential contour segment via a third, partially circular portion thereof.

16. A drive and evaluation unit for displacing an object comprising:
   a commutator motor with a stator having two diametrically opposed permanent magnets, the magnets each embodied by a cross-section having a circumferential contour segment with a radially inner circumferential contour segment;
   an armature having ten slots spaced apart circumferentially, the slots receiving armature windings embodied as lap windings, the armature windings each have a coil width that extends over three slots of the armature, wherein the radially inner circumferential contour segment of the magnets encompass the armature each via a respective inner circumferential angle thereof, and the circumferential angle of the radially inner circumferential contour segment of at least one of the permanent magnets is between 101° and 111°;
   a device for determining a rotary position of the armature by evaluating a waviness of the armature current or ripple count;
   wherein a radially outer circumferential contour segment of the cross-section of the permanent magnet has a pitch-circle-like course;
   wherein a first axis, on which center points of the radially inner circumferential contour segment and of the radially outer circumferential contour segment are located, intersects a rotary axis of the armature at an intersection point, and the center points and the intersection point are each spaced apart from one another; and
   wherein lateral circumferential contour segments have a first portion which extends obliquely outward at an angle between 20° and 30°, and which extends in a circumferential direction from the radially inner circumferential contour segment to a second axis extending perpendicular to the first axis.

17. The unit as defined by claim 16, wherein a first portion of the lateral circumferential contour segments is adjoined by a second portion thereof, which extends parallel to the first axis.

18. The unit as defined by claim 17, wherein a radially outer end of each second portion of the lateral circumferential contour segments is connected to the radially outer circumferential contour segment via a third, partially circular portion thereof.

19. The unit as defined by claim 18, wherein each third portion of the lateral circumferential contour segments are curved in partially circular shape around the intersection point of the first axis with the rotary axis of the armature.

* * * * *